(12) United States Patent
Ramaiah et al.

(10) Patent No.: US 8,074,275 B2
(45) Date of Patent: Dec. 6, 2011

(54) PREVENTING NETWORK DENIAL OF SERVICE ATTACKS BY EARLY DISCARD OF OUT-OF-ORDER SEGMENTS

(75) Inventors: Anantha Ramaiah, Sunnyvale, CA (US); Mahadev Somasundaram, Sunnyvale, CA (US); Senthil Sivakumar, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 1262 days.

(21) Appl. No.: 11/345,999

(22) Filed: Feb. 1, 2006

(65) Prior Publication Data

US 2007/0180533 A1    Aug. 2, 2007

(51) Int. Cl.
*H04L 12/00* (2006.01)
*H04L 12/28* (2006.01)
*H04L 29/14* (2006.01)

(52) U.S. Cl. .. 726/22; 370/394; 370/395.5; 370/395.52; 709/227; 709/228; 709/229

(58) Field of Classification Search ...................... 726/22
See application file for complete search history.

(56) References Cited

U.S. PATENT DOCUMENTS

| | | | | |
|---|---|---|---|---|
| 6,735,702 | B1 * | 5/2004 | Yavatkar et al. | 726/13 |
| 6,888,835 | B2 * | 5/2005 | Reeve | 370/395.52 |
| 2002/0026502 | A1 * | 2/2002 | Phillips et al. | 709/219 |
| 2002/0035681 | A1 * | 3/2002 | Maturana et al. | 713/151 |
| 2002/0116644 | A1 * | 8/2002 | Richard | 713/201 |
| 2002/0147722 | A1 * | 10/2002 | Banerjee | 707/100 |
| 2003/0079031 | A1 * | 4/2003 | Nagano | 709/229 |
| 2004/0008681 | A1 * | 1/2004 | Govindarajan et al. | 370/394 |
| 2005/0259644 | A1 * | 11/2005 | Huitema et al. | 370/389 |
| 2006/0007935 | A1 * | 1/2006 | Bennett et al. | 370/395.5 |
| 2006/0179147 | A1 * | 8/2006 | Tran et al. | 709/227 |

OTHER PUBLICATIONS

V. Jacobson et al., "TCP Extensions for High Performance," IETF RFC 1323, May 1992, pp. 1-33.
Anonymous, "NetBSD not vulnerable to TCP reassembly mbuf DoS," message posted in mailing list archive of Virus.org, Mar. 4, 2004, pp. 1-2.
Anonymous, Source code excerpt from "tcp-input.c" module revision 1.223 of NetBSD operating system, printed May 2, 2005, 1 page.
Information Sciences Institute of the University of Southern California, "Internet Protocol DARPA Internet Program Protocol Specification" (IETF RFC 791), Sep. 1981, pp. 1-49.

* cited by examiner

*Primary Examiner* — Taghi Arani
*Assistant Examiner* — Kenneth Chang
(74) *Attorney, Agent, or Firm* — Hickman Palermo Truong & Becker LLP (57) ABSTRACT

A method of preventing network denial of service attacks by early discard of out-of-order segments comprises creating a reassembly queue for a connection between a first network node and a second network node, wherein the connection has been established based on a transport-layer network protocol, the reassembly queue having a size based on a buffer size of an input interface with which the connection is associated. As out-of-order data segments arrive on the connection, and before other processing of the segments, whether the reassembly queue is full is determined, and the out-of-order segments are discarded if the reassembly queue is full. The size of the reassembly queue is automatically changed in response to one or more changes in any of network conditions and device resources.

16 Claims, 5 Drawing Sheets

FIG. 1C

130 CREATE TCP REASSEMBLY QUEUE FOR A TCP CONNECTION, THE QUEUE HAVING A SIZE BASED ON A BUFFER SIZE OF AN INPUT INTERFACE WITH WHICH THE CONNECTION IS ASSOCIATED

132 AS OUT-OF-ORDER TCP SEGMENTS ARRIVE, DISCARD SEGMENTS IF REASSEMBLY QUEUE IS FULL, BEFORE OTHER TCP PROCESSING

134 MANAGE SIZE OF TCP REASSEMBLY QUEUE AS CONDITIONS OR RESOURCES CHANGE

PREVENTING NETWORK DENIAL OF SERVICE ATTACKS BY EARLY DISCARD OF OUT-OF-ORDER SEGMENTS

CROSS-REFERENCE TO RELATED APPLICATION

The present application is related to U.S. application Ser. No. 10/815,218, filed Mar. 30, 2004, entitled "Preventing network data injection attacks using duplicate-ACK and reassembly gap approaches," of Anantha Ramaiah et al.

FIELD OF THE INVENTION

The present invention generally relates to network data communications. The invention relates more specifically to preventing attacks on networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Transmission Control Protocol (TCP) as described in IETF RFC 793 defines transport-layer messages that network nodes may communicate to achieve guaranteed data delivery and implement flow control. TCP data packets include a header carrying a segment sequence number that a receiver can use to determine whether the receiver has received all segments from a sender. Valid segments must have a sequence number falling in a changeable range defined as the receiver's sliding receive window. Different implementations can use receive windows of different sizes.

Varying network conditions can cause loss or delay of segments in a stream of segments that a sender sends a receiver. When a TCP implementation at the receiver receives segments bearing a sequence number higher than the highest previously acknowledged segment, the receiver stores the newly received segments in a reassembly queue for later processing after earlier missing segments arrive.

When too many out-of-order segments arrive on a TCP connection, and the receive window of a TCP implementation is large, then the TCP implementation is vulnerable to an attack consisting of a flood of spoofed segments. The receive window of an application might be large when an application uses large data records, or in applications that traverse satellite links or links in other so-called "long fat networks" in which delays are longer or more drops occur than with other kinds of links. Receive window scaling is described in V. Jacobson et al., "TCP Extensions for High Performance," IETF RFC 1323 (1992).

Since an incoming segment is more likely to be accepted if the receive window is large, vulnerability increases with window size. If the number of spoofed and received out-of-order segments is excessively large, then the reassembly queue can overflow. Alternatively, if a TCP implementation allocates more memory for the reassembly queue as more out-of-order segments arrive and overflow approaches, then eventually the TCP implementation may run out of memory. The result would be resource exhaustion and a successful denial of service (DOS) attack.

Further, in certain approaches in which segments are placed in the reassembly queue by writing a pointer to the segment in an interface input queue, overflow of the reassembly queue also may cause resource exhaustion at the interface input queue. This condition may trigger slow-start approaches in protocols such as UDP that are using the same interface but not associated with the problem condition. Resource starvation of all protocols that are using the interface may occur.

The same problem may arise when too many genuine out-of-order segments arrive. In that case, for efficient management of resources such as packet memory, then queuing too many segments is undesirable. However, it may be difficult to determine whether received segments are genuine or spoofed.

Known TCP stacks do not limit the size of the TCP reassembly queue. Implementing a hard-coded limit on the reassembly queue is inefficient, especially for applications that must use a large receive window size, or for applications in which the receive window is typically an order of magnitude larger than the normal window size. U.S. application Ser. No. 10/815,218, filed Mar. 30, 2004, entitled "Preventing network data injection attacks using duplicate-ACK and reassembly gap approaches," of Anantha Ramaiah et al., describes how to discard the "fake" data in the re-assembly queue.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for preventing network denial of service attacks by early discard of out-of-order segments is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
   2.0 Structural Overview
   3.0 Method of Preventing Network Denial of Service Attacks by Early Discard of out-of-order Segments
      3.1 High-Level Overview of Method
      3.2 Detailed Description of Method
   4.0 Implementation Mechanisms—Hardware Overview 5.0 Extensions and Alternatives 1.0 General Overview The needs identified in the foregoing Background, and other needs and objects that will become apparent for the following description, are achieved in the present invention, which comprises, in one aspect, a method of preventing network denial of service attacks by early discard of out-of-order segments that comprises creating a reassembly queue for a connection between a first network node and a second network node, wherein the connection has been established based on a transport-layer network protocol, the reassembly queue having a size based on a buffer size of an input interface with which the connection is associated. As out-of-order data segments arrive on the connection, and before other processing of the segments, whether the reassembly queue is full is determined, and the out-of-order segments are discarded if the reassembly queue is full. The size of the reassembly queue is automatically changed in response to one or more changes in any of network conditions and device resources.

In another aspect, the invention provides a method comprising the steps of establishing a connection between a first network node and a second network node using a transport-layer network protocol; creating a reassembly queue for the reassembly queue having a size based on a buffer size of an input interface with which the connection is associated; receiving an out-of-order segment on the connection; determining whether the reassembly queue is full; if the reassembly queue is full, then determining whether the reassembly queue should be enlarged based on one or more enlargement factors, and if the reassembly queue should be enlarged, then enlarging the reassembly queue and queuing the segment to the reassembly queue, and otherwise discarding the out-of-order segment.

According to one feature, the enlargement factors are any of an amount of system load, amount of available memory, number of connections on the interface, and information from one or more other attack detection applications. In another feature, the transport-layer network protocol is transmission control protocol (TCP) and the reassembly queue is a TCP segment reassembly queue.

In yet another feature, the transport-layer network protocol is transmission control protocol (TCP) and the reassembly queue is a TCP segment reassembly queue, and determining whether the reassembly queue is full is performed before processing of the segment other than validation of a checksum and any other TCP validations such as MD5, if enabled.

In other aspects, the invention encompasses a computer apparatus and a computer-readable medium configured to carry out the foregoing steps.

2.0 Structural Overview

Figure 1A:
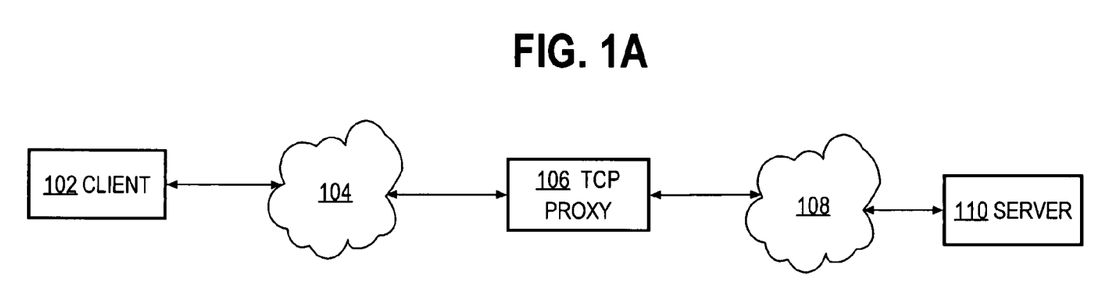
FIG. 1A is a block diagram that illustrates an overview of a network context in which an embodiment may be used.

FIG. 1A is a block diagram that illustrates an overview of a network context in which an embodiment may be used. A client 102 is coupled through a first network 104 to a TCP proxy 106, which is coupled directly or through a second network 108 to a server 110. Client 102 is a data processing device of any type that receives service from server 110 and communicates using TCP. For example, client 102 may be a network infrastructure element such as a router or switch, or may be an end station such as a workstation, PC, wireless device, etc. Network 104 may comprise a LAN, WAN, or one or more internetworks, such as the global group of internetworks termed "Internet."

TCP proxy 106 is a data processing device that terminates TCP connections on behalf of server 110 or other devices in network 108. In one embodiment, TCP proxy 106 is a router that is configured with TCP termination and proxy software, and is configured with logic to perform the functions that are further described herein. Network 108 typically is a LAN in which TCP proxy 106 is an edge device and server 110 is one network node.

For purposes of illustrating a simple example, FIG. 1A shows single elements as described above. However, alternative embodiments may include any number of clients 102, any number of servers 110, multiple TCP proxies 106, and other networks. Further, one TCP proxy 106 can terminate TCP connections for multiple clients 102 and can proxy connections for multiple servers 110.

Figure 1B:
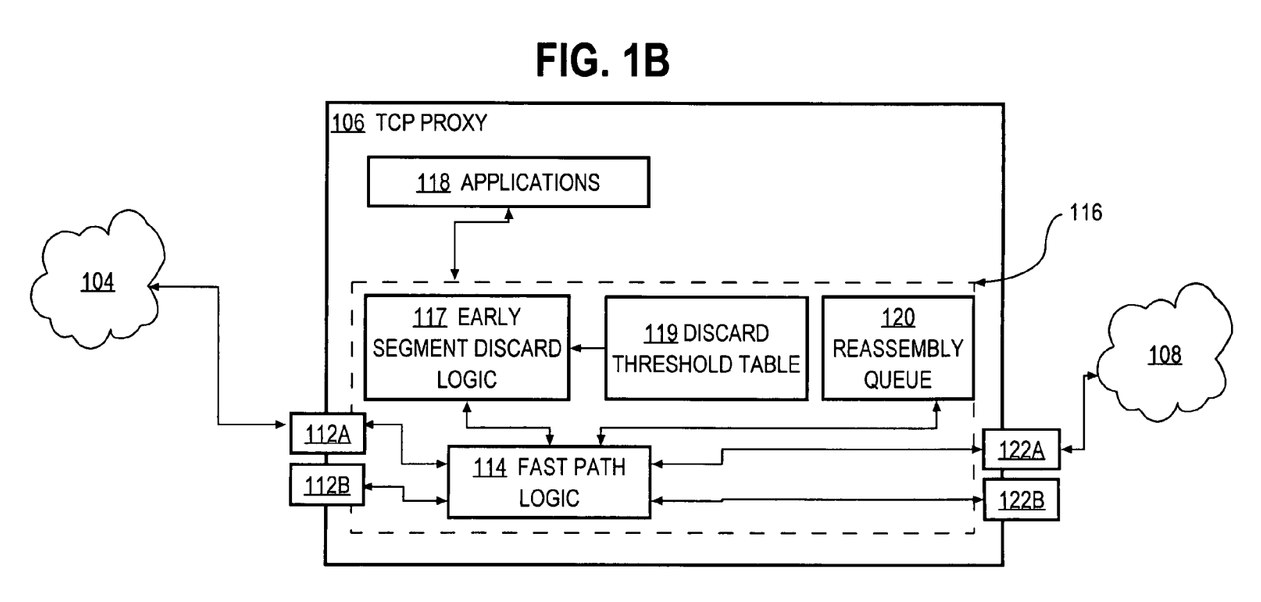
FIG. 1B is a block diagram of a TCP proxy device in which an embodiment may be used.

FIG. 1B is a block diagram of a TCP proxy device in which an embodiment may be used. In the embodiment of FIG. 1B, TCP proxy 106 comprises a TCP stack 116 that includes fast path logic 114, early segment discard logic 117, and a reassembly queue 120. TCP stack 116 also may comprise other functional elements consistent with implementing TCP under RFC 793, but which are omitted because such functional elements are known to skilled practitioners and could obscure the other elements shown herein.

Fast path logic 114 implements wire-speed processing of inbound TCP segments from a sender without storing copies of segments when segments are buffered. For example, in fast path processing, if a segment is sent to the reassembly queue or another form of buffer, no other copy of the segment is made, to improve performance. Fast path logic 114 is not required in an embodiment, and the approaches herein may interoperate with a TCP implementation that does not use fast path logic 114.

Early segment discard logic 117 comprises one or more computer programs or other software elements that implement the approaches that are described functionally herein. The reassembly queue 120 comprises a data structure in memory of TCP proxy 106 that temporarily stores received out-of-order TCP segments for later reassembly and communication, in correct order, to applications 118.

TCP proxy 106 also hosts one or more applications 118 that use underlying TCP connections, such as HTTP, SSL, etc. TCP proxy 106 also comprises one or more interfaces 112A, 112B that are communicatively coupled to network 104, and one or more interfaces 122A, 122B to network 108.

In an embodiment, TCP stack 106 also comprises a discard threshold table 119 that stores a discard threshold value in association with an identifier of each interface of the TCP stack 106. In this context, a discard threshold is the maximum size in bytes allowed in all reassembly buffers for all connections of an interface. Techniques for determining discard threshold values and using the discard threshold values are described further in the following sections.

Figure 1C:
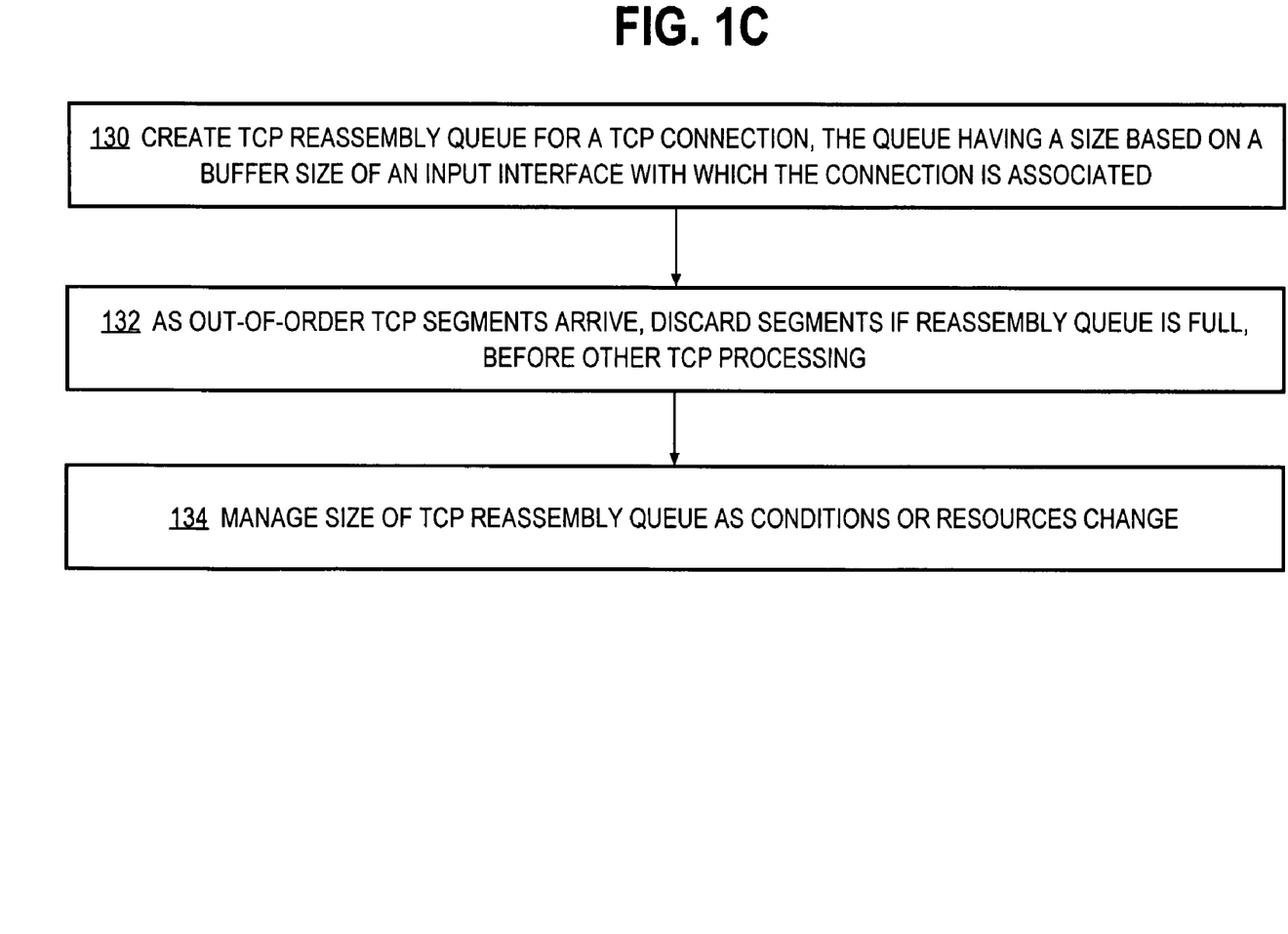
FIG. 1C is a flow diagram that illustrates a high level overview of one embodiment of a method for preventing network denial of service attacks by early discard of out-of-order segments.

3.0 Method of Preventing Network Denial of Service Attacks by Early Discard of out-of-Order Segments 3.1 High-Level Overview of Method FIG. 1C is a flow diagram that illustrates a high level overview of one embodiment of a method for preventing network denial of service attacks by early discard of out-of-order segments. For purposes of illustrating a clear example, FIG. 1C is described herein in the context of FIG. 1A, FIG. 1B. However, the broad approach of FIG. 1C can be implemented in many other network contexts.

In step 130, a reassembly queue for a connection between a first network node and a second network node is created. The connection has been established based on a transport-layer network protocol. Thus, at the time of step 130, for example, client 102 has negotiated a TCP connection with TCP proxy 106 on behalf of server 110, and the connection has reached the ESTABLISHED state.

The reassembly queue is created having a size in bytes that is based on a buffer size of an input interface with which the connection is associated. In one embodiment, the size of the reassembly queue is determined by examining the discard threshold value in the discard threshold table 119 for the interface associated with the connection, taking into account the number of other connections that are active and the size of the reassembly queues already allocated for the other connections. The reassembly queue is created based on an input queue of an interface to ensure that the interface input queue does not overflow. For example, in one embodiment a segment in an interface input queue is transferred to a reassembly queue for a connection by writing, in the reassembly queue, a pointer to the segment that is in the interface input queue. The pointer approach is used to avoid multi-level copying and queuing for performance reasons. In this approach, if an arbitrary number of segments is allowed in all reassembly queues for multiple connections, then the interface input queue would overflow. Therefore, the reassembly queue size is managed based on the interface input queue size to ensure that the total size of all segments in all reassembly queues does not exceed the total interface input queue size.

"Interface input queue," in this context, refers to a queue that is maintained in a link layer protocol driver.

Thus, step 130 assumes that a discard threshold value has been determined for each interface of a device before starting the process of FIG. 1C. For example, using configuration commands, a network administrator creates discard threshold table 119 in which a discard threshold value is stored for each interface of TCP proxy 106. Alternatively, TCP proxy 106 self-creates the discard threshold table 119 during bootstrap loading or during execution of an initial configuration. By default, the discard threshold value for an interface is equal to the input queue limit of the interface—that is, the maximum number of bytes that an interface is allowed to buffer for processing by other elements of the TCP proxy 106.

As an example, if the connection of client 102 and server 110 uses interface 112A, and the input queue limit of interface 112A is 65536 bytes, then the discard threshold value in table 119 for 112A is initially set to a value less than 65536, based upon the expectation that other protocols (e.g., UDP) will use the same interface and to minimize starving of the other protocols. As connections are created on interface 112A, a reassembly queue is created for each connection, and the size of each reassembly queue is some number of bytes less than 65536 that is selected to allow a reasonable number of connections and reassembly queues of reasonable size. In one embodiment, the size of each reassembly queue is determined based upon the value of "rcvwnd" in combination with the number of connections that the associated network element is expected to handle simultaneously. Alternatively, the logic for determining the number of bytes per connection could be implemented more dynamically by knowing the number of concurrent TCP connections to be supported and the number of currently instantiated connections.

In step 132, as out-of-order data segments arrive on the connection, and before other processing of the segments, the process determines whether the reassembly queue is full, and the out-of-order segments are discarded if the reassembly queue is full. In an embodiment, the discard threshold value for the interface associated with the connection is examined. If adding another segment to the reassembly queue would exceed the discard threshold value for the interface associated with the connection, then the reassembly queue is full, and the segment is discarded. Therefore, a denial of service attack predicated on sending a flood of spoofed out-of-order segments cannot cause the reassembly buffer to grow continually until resources are exhausted.

In step 134, the size of the reassembly queue is managed in response to one or more changes in any of network conditions and device resources. Management, in this context, means automatically changing the size of the reassembly queue based on changes in network conditions or device resources.

The following sections describe in more detail what changes can occur, and what conditions may cause changes. The broad approach represented in FIG. 1C is that the reassembly queue is modified only in response to particular network changes or changes in device resources. However, the reassembly queue is not routinely modified as out-of-order segments arrive. Applying the intelligent approach to reassembly queue management disclosed herein provides security against denial of service attacks.

3.2 Detailed Description of Method

Figure 2A:
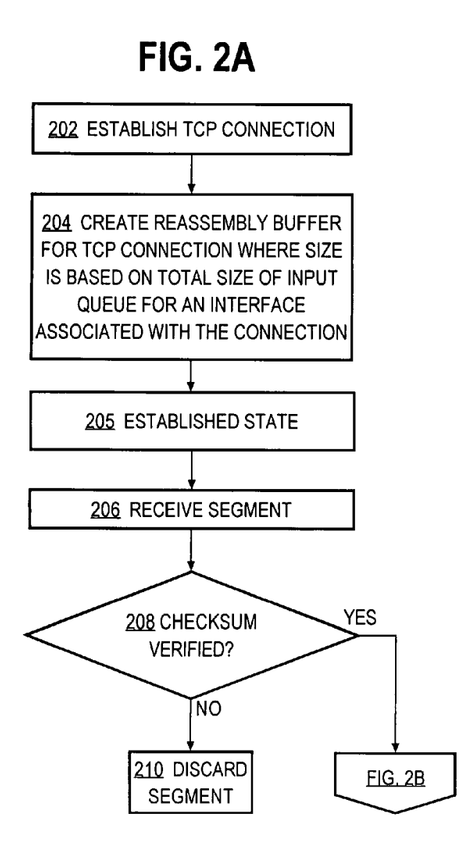
FIG. 2A is a flow diagram that illustrates another embodiment of a method for preventing network denial of service attacks by early discard of out-of-order segments.
Figure 2B:
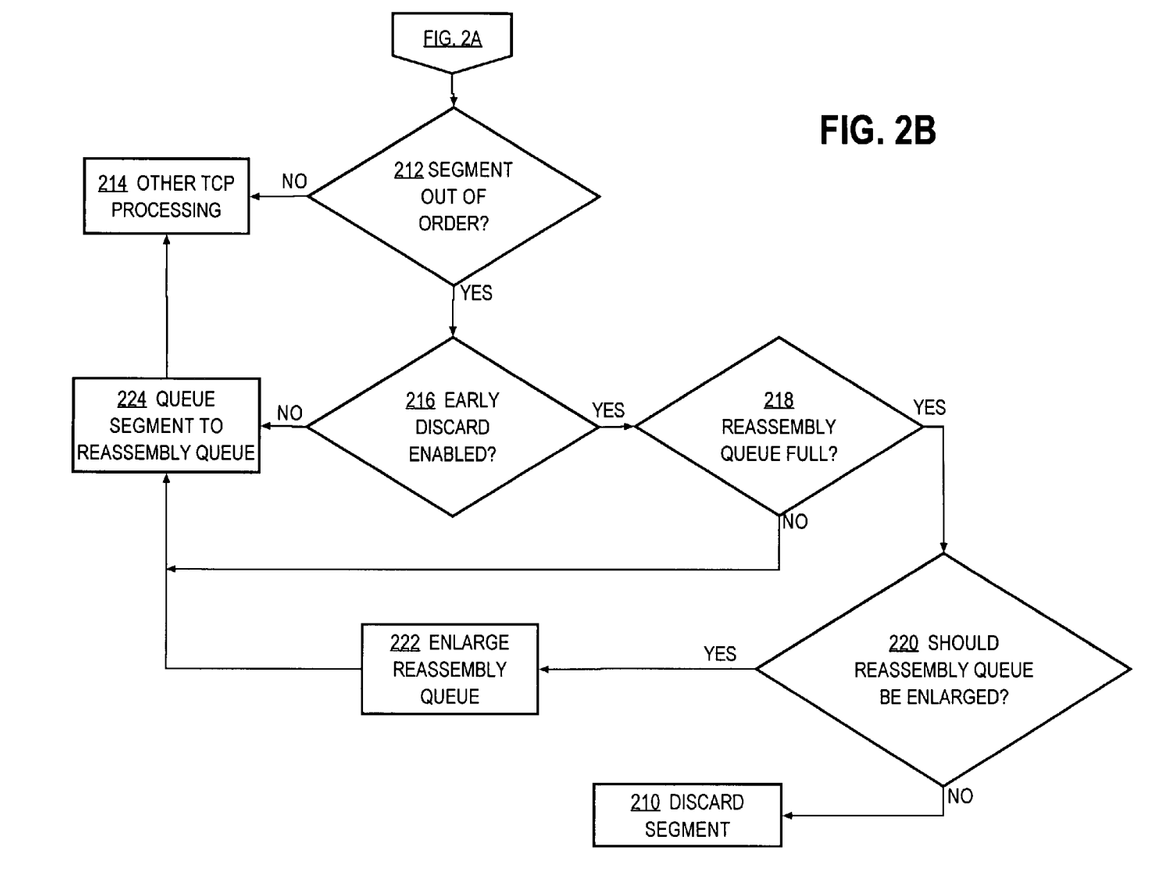
FIG. 2B is a flow diagram of further steps in the method of FIG. 2A.
Figure 3:
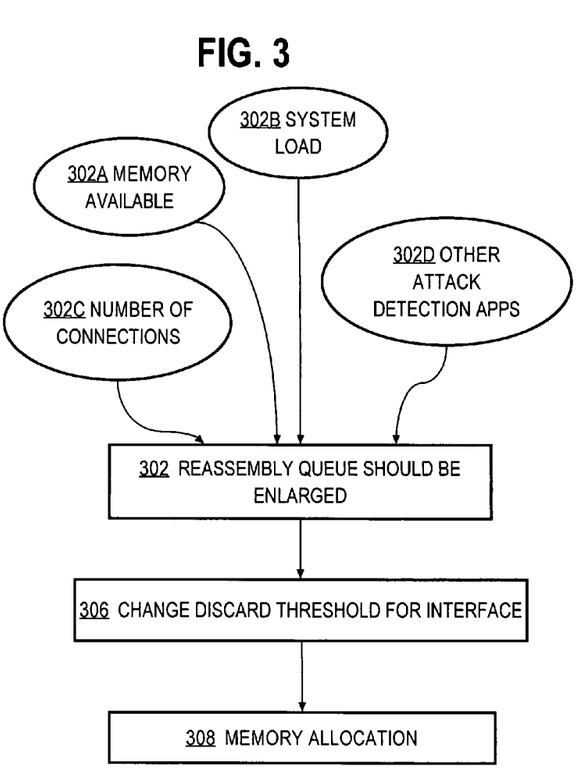
FIG. 3 is a block diagram of further steps that may be used to enlarge a reassembly queue.

FIG. 2A is a flow diagram that illustrates another embodiment of a method for preventing network denial of service attacks by early discard of out-of-order segments; FIG. 2B is a flow diagram of further steps in the method of FIG. 2A; FIG. 3 is a block diagram of further steps that may be used to enlarge a reassembly queue. Referring first to FIG. 2A, in step 202 a TCP connection is established. For example, client 102 and TCP proxy 106 engage in the three-way TCP "handshake" for a new connection as defined in RFC 793.

In step 204, a reassembly buffer is created for the TCP connection. The size of the reassembly buffer is based on the total size of an input queue for an interface that is associated with the connection. The approach described above for step 130 may be used. At step 205, the TCP connection reaches the ESTABLISHED state and the TCP peers begin to exchange data.

In step 206, a TCP data segment is received. For example, assume that client 102 is sending or uploading data to server 110, and TCP proxy 106 acts as a proxy for the server; in step 206, the TCP proxy receives a data segment from the client. As in conventional practice, the TCP segment carries a checksum that can be used to verify the integrity of the segment, that is, whether a complete and error-free segment was received. In step 208, a test is performed to determine if the checksum in the segment can be verified. If not, then the segment is discarded at step 210. If the checksum is verified, then control proceeds to FIG. 2B.

Referring now to step 2B, if step 208 has a positive result, then in step 212 a test is performed to determine whether the received segment is out of order. A segment is determined to be out of order if the sequence number carried in the TCP header of the segment is greater than the "rcvnxt" value stored in the Transmission Control Block (TCB) for the connection, indicating that one or more earlier segments have been missed. If the received segment is not out of order, then in step 214 other TCP processing, not germane to the present description, is performed on the segment.

If the segment is out of order, then in step 216 a test is performed to determine whether an early discard capability or policy is enabled. In an embodiment, the early discard approach provided herein may be configured as "enabled" or "disabled" on a device or on an interface of a device. In one embodiment, the early discard approach could be disabled by default and enabled only when the host device, such as TCP proxy 106, receives a number of out of order segments greater than an enablement threshold value. Thus, the TCP proxy 106 could set the early discard approach as disabled by default, then count the number of out of order segments in a particular time period, and set the early discard approach as enabled when the number of segments crosses the enablement threshold.

If the early discard capability is disabled, then in step 224 the segment is queued to the reassembly queue for later processing when missed segments.

If the early discard capability is enabled, then control passes to step 218 in which a test is performed to determine whether the reassembly queue is full. Step 218 may involve comparing the length of the received segment, plus the total number of bytes stored in all reassembly buffers for the interface associated with the connection, to the discard threshold value for that interface. If adding the received segment to the reassembly queue would exceed the discard threshold, then the reassembly queue is full. Alternatively, step 218 may involve comparing the number of unused bytes remaining in the reassembly queue to the length of the received segment, to determine if the received segment will fit in the reassembly queue.

If the reassembly queue is not full, then the segment is queued to the reassembly queue at step 224.

If the reassembly queue is full, then in step 220 a test is performed to determine whether the reassembly queue should be enlarged. Referring now to FIG. 3, step 220 may involve evaluating factors such as the amount of system memory available 302A, system load 302B, the number of connections 302C currently active on an interface associated with the present connection, and information 302D from other attack detection applications. Information 302D also may come from applications 118.

If step 220 determines that the reassembly queue should be enlarged, then in step 222 the reassembly queue is enlarged. Referring again to FIG. 3, in step 306 enlargement may involve changing the discard threshold value associated with the interface that is hosting the present connection. Thus, step 306 may involve updating a value in discard threshold table 119 with a new, higher value that allows more out-of-order segments to enter the reassembly queue. Alternatively, enlargement may involve performing a memory allocation 308 that results in adding memory to the reassembly queue.

If step 220 has a negative result, then control transfers to step 210 at which the segment is discarded.

Preferably, the tests of steps 212, 216, 218 are performed as early as possible in processing a newly received TCP segment. In one embodiment, the tests of steps 212, 216, 218 are performed before all other processing of a TCP segment other than checksum validation (FIG. 2A).

Thus, in the approach herein, a transport layer connection reassembly queue is not routinely enlarged when out of order segments arrive. Instead, the reassembly queue is enlarged, or additional out of order segments are added to the reassembly queue, only when evaluation of the factors of FIG. 3 yields an indication that enlargement is appropriate. Also, tests to determine whether the reassembly queue is full are performed as early as possible, so that spurious out-of-order segments are discarded as early as possible and not subjected to other processing. Further, early checking means that overhead associated with buffer copying and queuing is avoided.

In one embodiment, the approach herein provides a mechanism to limit the amount of out-order segments received for a TCP connection and to intelligently deal with resource starvation attacks. The approach allows a connection to use a relatively large TCP window size with resistance to attacks in which an attacker sends a large number of out of order segments, intending to overflow the reassembly queue and consume resources. The approach can be used in TCP implementations that use fast path TCP processing, or layer 4 switching, in which genuine out of order segments need to be queued without making a copy for performance reasons. The approach can prevent attacks in which too many such packets arrive for a TCP connection in an attempt to starve other applications and cause denial of service.

The discard threshold value for an interface can be calculated dynamically depending on the number of active connections at any particular point of time.

Implementations of this approach can be used with any TCP code and any TCP fast-path code. For example, TCP accelerators and offload engines can use the techniques herein to manage resources efficiently. The approach herein can be used in an SSLVPN management device that terminates TCP connections using a split connection model, such that one TCP connection faces the client and a second connection faces the server. In such a device, Layer 4 switching is performed more efficiently using the techniques herein.

Any other system or device that performs TCP termination or TCP connection splicing can use the techniques herein. For example, the TCP stack implementations in Cisco IOS® Software and BSD Unix can benefit from the techniques herein. TCP stacks in embedded systems may particularly benefit.

In an alternative embodiment, a scaling factor approach can be used as follows. For simplicity, each resource is measured in terms of the number of packets it can hold, but in an embodiment, measurements in bytes may be used. The approach assumes that the TCP window size (W) is much greater than the interface queue depth (D). W represents the combined window size of all the TCP connections that are ingressing on an interface i.

Let C denote a counter that represents the number of out of order segments (or packets in the reassembly queue) for all the TCP connections ingressing into interface i. Each interface in a device has such a counter C. The early segment discard approach herein is applied when C==xD, where x is a scaling factor in a range (0.1 ... 0.9). The value of x can be initialized at 0.5 and can vary based on resource conditions and device requirements. The value of x can be chosen by a heuristic or by taking into consideration factors such as system load, number of connections supported, etc. Thus, in a combination with the approach of FIG. 3, at step 306 the scaling factor could be adjusted based on the input values shown in FIG. 3.

Thus, initializing x with a conservative value of 0.5 and increasing or decreasing the value of x slowly based on some heuristic is adaptive and also should guarantee that other connections, including non-TCP connections, would receive the remainder (1−x) portion of the queue.

4.0 Implementation Mechanisms—Hardware Overview

Figure 4:
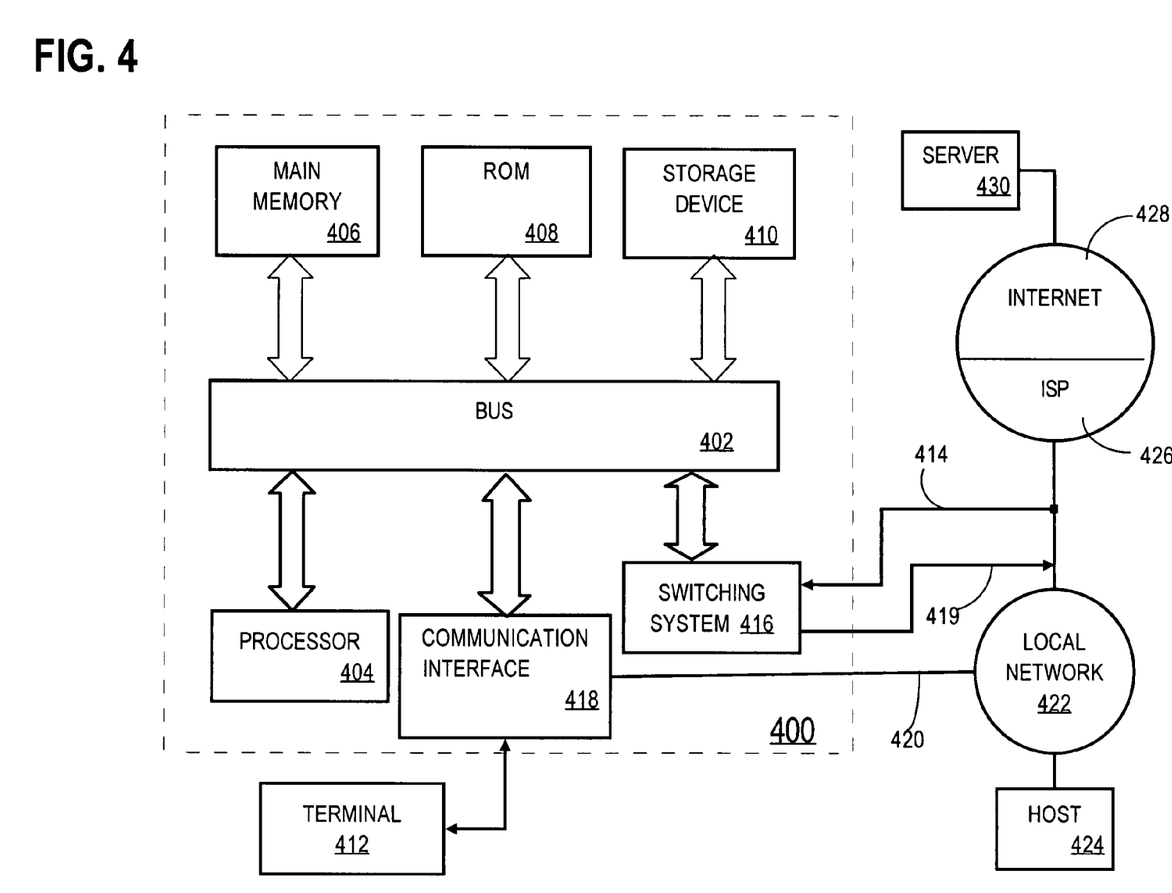
FIG. 4 is a block diagram that illustrates a computer system upon which an embodiment may be implemented.

FIG. 4 is a block diagram that illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a bus 402 or other communication mechanism for communicating information, and a processor 404 coupled with bus 402 for processing information. Computer system 400 also includes a main memory 406, such as a random access memory (RAM), flash memory, or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, flash memory or optical disk, is provided and coupled to bus 402 for storing information and instructions.

A communication interface 418 may be coupled to bus 402 for communicating information and command selections to processor 404. Interface 418 is a conventional serial interface such as an RS-232 or RS-422 interface. An external terminal 412 or other computer system connects to the computer system 400 and provides commands to it using the interface 414. Firmware or software running in the computer system 400 provides a terminal interface or character-based command interface so that external commands can be given to the computer system.

A switching system 416 is coupled to bus 402 and has an input interface 414 and an output interface 419 to one or more external network elements. The external network elements may include a local network 422 coupled to one or more hosts 424, or a global network such as Internet 428 having one or more servers 430. The switching system 416 switches information traffic arriving on input interface 414 to output interface 419 according to pre-determined protocols and conventions that are well known. For example, switching system 416, in cooperation with processor 404, can determine a destination of a packet of data arriving on input interface 414 and send it to the correct destination using output interface 419. The destinations may include host 424, server 430, other end stations, or other routing and switching devices in local network 422 or Internet 428.

The invention is related to the use of computer system 400 for preventing network denial of service attacks by early discard of out-of-order segments. According to one embodiment of the invention, preventing network denial of service attacks by early discard of out-of-order segments is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Communication interface 418 also provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for preventing network denial of service attacks by early discard of out-of-order segments as described herein.

Processor 404 may execute the received code as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implemented method, comprising:
    establishing a connection between a first network node and a second network node using a transport-layer network protocol;
    creating a dynamically-sized reassembly queue for the connection between the first network node and the second network node, the dynamically-sized reassembly queue having a size based on a buffer size of an input interface with which the connection is associated;
    receiving a segment on the connection;
    determining whether the received segment is an out-of-order segment;
    in response to determining that the received segment is not an out-of-order segment, then performing normal processing on the received segment;
    in response to determining that the received segment is an out-of-order segment, then prior to performing processing of the received segment on the connection other than error check processing, determining whether the dynamically-sized reassembly queue is full;
    in response to determining that the dynamically-sized reassembly queue is full, then determining, based upon one or more enlargement factors, whether the dynamically-sized reassembly queue should be enlarged, wherein the one or more enlargement factors include one or more of an amount of system load, an amount of available memory, a number of connections on the interface, and information from one or more other attack detection applications;
    in response to determining both that the dynamically-sized reassembly queue is full and that the dynamically-sized reassembly queue should be enlarged based upon the one or more enlargement factors, then dynamically enlarging the dynamically-sized reassembly queue to create an enlarged dynamically-sized reassembly queue and queuing the received segment to the enlarged dynamically-sized reassembly queue, and
    in response to determining that the received segment is an out-of-order segment, that the dynamically-sized reassembly queue is full and that the dynamically-sized reassembly queue should not be enlarged based upon the one or more enlargement factors, then prior to performing processing of the received segment on the connection other than error check processing, discarding the received segment.

2. The computer-implemented method as recited in claim 1, wherein the transport-layer network protocol is transmission control protocol (TCP) and wherein the dynamically-sized reassembly queue is a dynamically-sized TCP segment reassembly queue.

3. The computer-implemented method as recited in claim 1, wherein:
    the transport-layer network protocol is transmission control protocol (TCP), the dynamically-sized reassembly queue is a dynamically-sized TCP segment reassembly queue, and determining whether the dynamically-sized reassembly queue is full is performed prior to performing processing of the received segment on the connection other than checksum validation.

4. A non-transitory computer-readable medium storing instructions for preventing network denial of service attacks by early discard of out-of-order segments, wherein processing of the instructions by one or more processors, causes:
    establishing a connection between a first network node and a second network node using a transport-layer network protocol;
    creating a dynamically-sized reassembly queue for the connection between the first network node and the second network node, the dynamically-sized reassembly queue having a size based on a buffer size of an input interface with which the connection is associated;
    receiving a segment on the connection;
    determining whether the received segment is an out-of-order segment;
    in response to determining that the received segment is not an out-of-order segment, then performing normal processing on the received segment;
    in response to determining that the received segment is an out-of-order segment, then prior to performing processing of the received segment on the connection other than error check processing, determining whether the dynamically-sized reassembly queue is full;
    in response to determining that the dynamically-sized reassembly queue is full, then determining, based upon one or more enlargement factors, whether the dynamically-sized reassembly queue should be enlarged, wherein the one or more enlargement factors include one or more of an amount of system load, an amount of available memory, a number of connections on the interface, and information from one or more other attack detection applications;
    in response to determining both that the dynamically-sized reassembly queue is full and that the dynamically-sized reassembly queue should be enlarged based upon the one or more enlargement factors, then dynamically enlarging the dynamically-sized reassembly queue to create an enlarged dynamically-sized reassembly queue and queuing the received segment to the enlarged dynamically-sized reassembly queue, and
    in response to determining that the received segment is an out-of-order segment, that the dynamically-sized reassembly queue is full and that the dynamically-sized reassembly queue should not be enlarged based upon the one or more enlargement factors, then prior to performing processing of the received segment on the connection other than error check processing, discarding the received segment.

5. An apparatus, comprising:
    means for establishing a connection between a first network node and a second network node using a transport-layer network protocol;
    means for creating a dynamically-sized reassembly queue for the connection between the first network node and the second network node, the dynamically-sized reassembly queue having a size based on a buffer size of an input interface with which the connection is associated;
    means for receiving a segment on the connection;
    means for determining whether the received segment is an out-of-order segment;
    means for in response to determining that the received segment is not an out-of-order segment, then performing normal processing on the received segment;
    means for in response to determining that the received segment is an out-of-order segment, then prior to performing processing of the received segment on the connection other than error check processing, determining whether the dynamically-sized reassembly queue is full;
    means for in response to determining that the dynamically-sized reassembly queue is full, then determining, based upon one or more enlargement factors, whether the dynamically-sized reassembly queue should be enlarged, wherein the one or more enlargement factors include one or more of an amount of system load, an amount of available memory, a number of connections on the interface, and information from one or more other attack detection applications;

means for in response to determining both that the dynamically-sized reassembly queue is full and that the dynamically-sized reassembly queue should be enlarged based upon the one or more enlargement factors dynamically enlarging the dynamically-sized reassembly queue to create an enlarged dynamically-sized reassembly queue and queuing the received segment to the enlarged dynamically-sized reassembly queue, and means for in response to determining that the received segment is an out-of-order segment, that the dynamically-sized reassembly queue is full and that the dynamically-sized reassembly queue should not be enlarged based upon the one or more enlargement factors, then prior to performing processing of the received segment on the connection other than error check processing, discarding the received segment.

6. The apparatus as recited in claim 5, wherein the transport-layer network protocol is transmission control protocol (TCP) and wherein the dynamically-sized reassembly queue is a dynamically-sized TCP segment reassembly queue.

7. The apparatus as recited in claim 5, wherein:
the transport-layer network protocol is transmission control protocol (TCP),
the dynamically-sized reassembly queue is a dynamically-sized TCP segment reassembly queue, and
determining whether the dynamically-sized reassembly queue is full is performed prior to performing processing of the received segment on the connection other than checksum validation.

8. An apparatus for preventing network denial of service attacks by early discard of out-of-order segments, comprising:
a network interface that is coupled to a data network for receiving one or more packet flows therefrom;
one or more processors; and
a memory storing instructions which, when processed by the one or more processors, cause:
establishing a connection between a first network node and a second network node using a transport-layer network protocol;
creating a dynamically-sized reassembly queue for the connection between the first network node and the second network node, the dynamically-sized reassembly queue having a size based on a buffer size of an input interface with which the connection is associated;
receiving a segment on the connection;
determining whether the received segment is an out-of-order segment;
in response to determining that the received segment is not an out-of-order segment, then performing normal processing on the received segment;
in response to determining that the received segment is an out-of-order segment, then prior to performing processing of the received segment on the connection other than error check processing, determining whether the dynamically-sized reassembly queue is full;
in response to determining that the dynamically-sized reassembly queue is full, then determining, based upon one or more enlargement factors, whether the dynamically-sized reassembly queue should be enlarged, wherein the one or more enlargement factors include one or more of an amount of system load, an amount of available memory, a number of connections on the interface, and information from one or more other attack detection applications;

in response to determining both that the dynamically-sized reassembly queue is full and that the dynamically-sized reassembly queue should be enlarged based upon the one or more enlargement factors, then dynamically enlarging the dynamically-sized reassembly queue to create an enlarged dynamically-sized reassembly queue and queuing the received segment to the dynamically-sized reassembly queue, and in response to determining that the received segment is an out-of-order segment, that the dynamically-sized reassembly queue is full and that the dynamically-sized reassembly queue should not be enlarged based upon the one or more enlargement factors, then prior to performing processing of the received segment on the connection other than error check processing, discarding the received segment.

9. The apparatus as recited in claim 8, wherein the transport-layer network protocol is transmission control protocol (TCP) and wherein the dynamically-sized reassembly queue is a dynamically-sized TCP segment reassembly queue.

10. The apparatus as recited in claim 8, wherein:
the transport-layer network protocol is transmission control protocol (TCP),
the dynamically-sized reassembly queue is a dynamically-sized TCP segment reassembly queue, and
determining whether the dynamically-sized reassembly queue is full is performed prior to performing processing of the received segment on the connection other than checksum validation.

11. The apparatus as recited in claim 8, wherein the instructions include instructions which, when processed by the one or more processors, causes enlarging the dynamically-sized reassembly queue by changing a scaling factor associated with the dynamically-sized reassembly queue.

12. The apparatus as recited in claim 8, wherein the apparatus comprises one or more of a router, a switch, and a TCP proxy.

13. The apparatus as recited in claim 5, wherein the means for enlarging the dynamically-sized reassembly queue comprises means for changing a scaling factor associated with the dynamically-sized reassembly queue.

14. A TCP proxy apparatus that prevents network denial of service attacks by early discard of out-of-order segments, comprising:
a network interface that is coupled to a data network for receiving one or more packet flows therefrom;
one or more processors; and
a memory storing instructions which, when processed by the one or more processors, cause:
establishing a connection between a first network node and a second network node using a transport-layer network protocol;
creating a TCP reassembly queue for the connection between the first network node and the second network node, the TCP reassembly queue having a size based on a buffer size of an input interface with which the connection is associated;
receiving a segment on the connection;
determining whether the received segment is an out-of-order segment;
in response to determining that the received segment is not an out-of-order segment, then performing normal processing on the received segment;

in response to determining that the received segment is an out-of-order segment, then prior to performing processing of the received segment on the connection other than error check processing, determining whether the TCP reassembly queue is full;

in response to determining that the TCP reassembly queue is full, then determining, based upon one or more enlargement factors, whether the TCP reassembly queue should be enlarged, wherein the one or more enlargement factors include one or more of an amount of system load, an amount of available memory, a number of connections on the interface, and information from one or more other attack detection applications;

in response to determining both that the TCP reassembly queue is full and that the TCP reassembly queue should be enlarged based upon the one or more enlargement factors, then dynamically enlarging the TCP reassembly queue by changing a scaling factor associated with the TCP reassembly queue and queuing the received segment to the TCP reassembly queue; and in response to determining that the received segment is an out-of-order segment, that the TCP reassembly queue is full and that the reassembly queue should not be enlarged based upon the one or more enlargement factors, then prior to performing processing of the received segment on the connection other than error check processing, discarding the received segment.

15. The computer-readable medium as recited in claim 4, wherein:
the transport-layer network protocol is transmission control protocol (TCP),
the dynamically-sized reassembly queue is a dynamically-sized TCP segment reassembly queue, and
determining whether the dynamically-sized reassembly queue is full is performed prior to performing processing of the received segment on the connection other than checksum validation.

16. The computer-readable medium as recited in claim 4, wherein the transport-layer network protocol is transmission control protocol (TCP) and wherein the dynamically-sized reassembly queue is a dynamically-sized TCP segment reassembly queue.

* * * * *